United States Patent
Tomaru

(10) Patent No.: US 11,132,089 B2
(45) Date of Patent: *Sep. 28, 2021

(54) INPUT DEVICE

(71) Applicant: DENSO CORPORATION, Kariya (JP)

(72) Inventor: Tetsuya Tomaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,746

(22) Filed: Jun. 8, 2020

(65) Prior Publication Data
US 2020/0301561 A1 Sep. 24, 2020

Related U.S. Application Data

(63) Continuation of application No. PCT/JP2018/040694, filed on Nov. 1, 2018.

(30) Foreign Application Priority Data

Dec. 12, 2017 (JP) .............................. JP2017-237601

(51) Int. Cl.
*G06F 3/041* (2006.01)
*B60K 35/00* (2006.01)
*G06F 3/0488* (2013.01)

(52) U.S. Cl.
CPC .......... *G06F 3/04186* (2019.05); *B60K 35/00* (2013.01); *G06F 3/04886* (2013.01); *B60K 2370/1438* (2019.05)

(58) Field of Classification Search
CPC .. G06F 3/04186; G06F 3/04886; G06F 3/016; G06F 3/01; B60K 35/00;
(Continued)

(56) References Cited

U.S. PATENT DOCUMENTS

2007/0205882 A1* 9/2007 Ehrlich .................... H04Q 9/00
340/447

FOREIGN PATENT DOCUMENTS

JP 2008070983 A 3/2008
JP 2016184428 A 10/2016
(Continued)

OTHER PUBLICATIONS

U.S. Appl. No. 16/895,258, filed Jun. 8, 2020, Tetsuya Tomaru.
U.S. Appl. No. 16/895,501, filed Jun. 8, 2020, Tetsuya Tomaru.

*Primary Examiner* — Carolyn R Edwards
(74) *Attorney, Agent, or Firm* — Harness, Dickey & Pierce, P.L.C.

(57) ABSTRACT

An input device includes: a detector that detects an operation state of an operation object on an operation surface; a controller that performs input to a predetermined instrument; and a driver that vibrates the operation surface. The predetermined instrument includes a display. Multiple operation buttons are displayed on the display. An operation coordinate position of the operation object is associated with a display coordinate position of each of the multiple operation buttons. The controller causes the driver to generate a predetermined vibration on an area of the operation surface corresponding to an intermediate area between a first operation button and a second operation button. The controller corrects a first display coordinate position to a second display coordinate position or prohibit an attraction control.

6 Claims, 11 Drawing Sheets

(58) Field of Classification Search
CPC ...... B60K 2370/1438; B60K 2370/158; B60K 2370/1434; B60K 37/06; G05G 1/01; G05G 5/03; G05G 25/00
See application file for complete search history.

(56) References Cited

FOREIGN PATENT DOCUMENTS

| | | |
|---|---|---|
| JP | 2017130021 A | 7/2017 |
| WO | WO-2018163626 A1 | 9/2018 |
| WO | WO-2019017009 A1 | 1/2019 |
| WO | WO-2019116771 A1 | 6/2019 |

\* cited by examiner

INPUT DEVICE

CROSS REFERENCE TO RELATED APPLICATIONS

The present application is a continuation application of International Patent Application No. PCT/JP2018/040694 filed on Nov. 1, 2018, which designated the U.S. and claims the benefit of priority from Japanese Patent Application No. 2017-237601 filed on Dec. 12, 2017. The entire disclosures of all of the above applications are incorporated herein by reference.

TECHNICAL FIELD

The present disclosure relates to an input device that enables an input operation with an operation object such as a finger, such as an operation using a touch pad or a touch panel.

BACKGROUND

In a comparative example, an input device is placed at a position different from a position of a display device. The input device includes the touch pad that detects an operation position of the finger on an operation surface, an actuator that controls a frictional force between the finger and the operation surface by vibrating the operation surface based on a detection result of the touch pad, and a controller that controls an actuation of the actuator.

SUMMARY

An input device may include: a detector that may detect an operation state of an operation object on an operation surface; a controller that may perform input to a predetermined instrument; and a driver that may vibrate the operation surface. The predetermined instrument may include a display. Multiple operation buttons may be displayed on the display. An operation coordinate position of the operation object may be associated with a display coordinate position of each of the multiple operation buttons. The controller may cause the driver to generate a predetermined vibration on an area of the operation surface corresponding to an intermediate area between a first operation button and a second operation button. The controller may correct a first display coordinate position to a second display coordinate position or prohibit an attraction control.

BRIEF DESCRIPTION OF DRAWINGS

The above and other aspects, features and advantages of the present disclosure will become more apparent from the following detailed description made with reference to the accompanying drawings. In the accompanying drawings.

DETAILED DESCRIPTION

Figure 1:
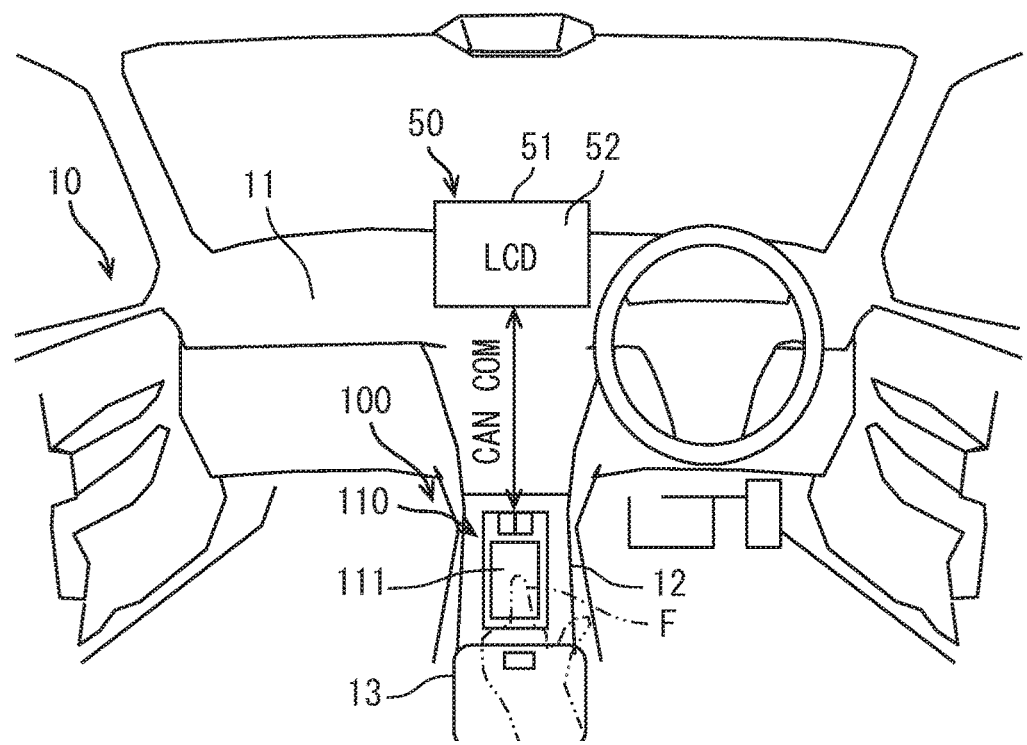
FIG. 1 is an explanatory view showing a mounting state of an input device in a vehicle.
Figure 2:
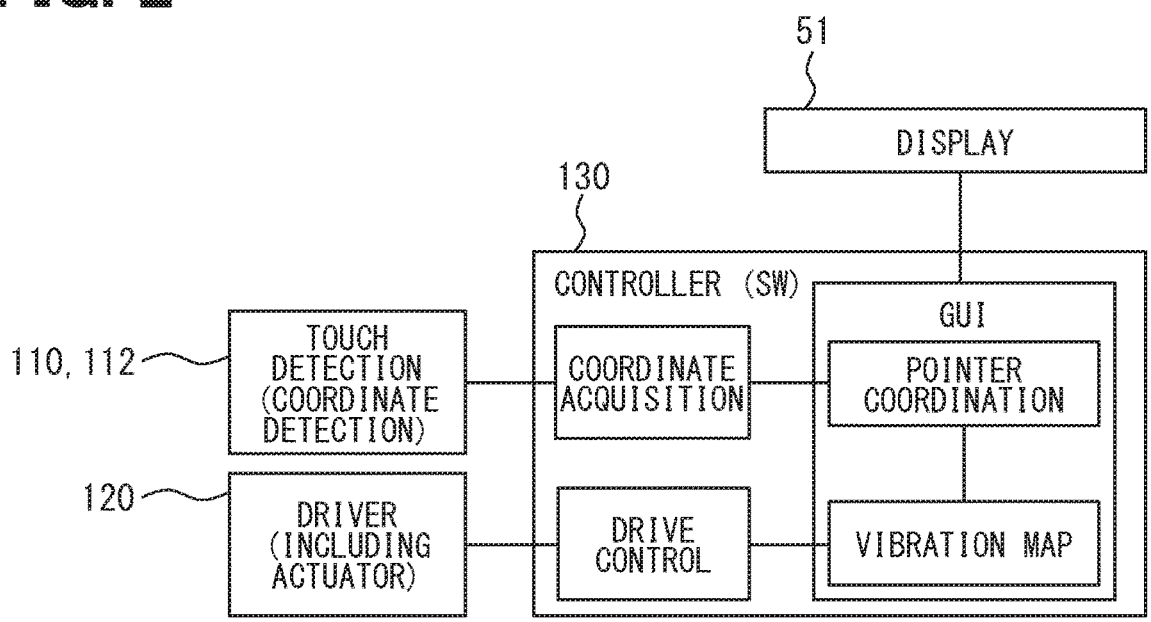
FIG. 2 is a block diagram showing the input device.

In a comparative example, an input device is placed at a position different from a position of a display device. The input device includes the touch pad that detects an operation position of the finger on an operation surface, an actuator that controls a frictional force between the finger and the operation surface by vibrating the operation surface based on a detection result of the touch pad, and a controller that controls an actuation of the actuator. The input device enables input to an icon displayed on the display device by performing a finger operation on the icon on the touch pad. The input device may be also referred to as a tactile sense presentation device. The touch pad may be also referred to as an operation detector. The actuator may be also referred to as a vibrator. The icon displayed on the display device may be also referred to as an operation button.

On the touch pad, an area corresponding to the icon of the display device is defined as a target area. An area corresponding to the periphery of the icon is defined as a peripheral area. When the finger moves on the operation surface of the touch pad from an area other than the peripheral area to the target area through the peripheral area, the controller actuates the actuator and vibration occurs in the peripheral area.

When the finger moves in the area other than the peripheral area, the vibration does not occur and a predetermined frictional force occurs to be applied to the finger. When the finger passes through the peripheral area, a squeeze effect occurs between the finger and the operation surface due to the vibration occurrence. The frictional force of the finger on the operation surface decreases. Then, a movement speed of the finger increases. Furthermore, when the finger moves in a target, the vibration does not occur, and the predetermined frictional force occurs on the finger. When an operator performs the finger operation so that the finger moves from the area other than the peripheral area to the target area through the peripheral area, the frictional force decreases in the peripheral area. A feeling of attracting the finger toward the target area occurs.

When an input device performs an absolute value operation in which an absolute position on the operation surface is associated with an absolute position of the icon of the display device, the following difficulties may occur.

That is, when the operator attempts to start the operation and the position of the finger placed on the operation surface is in the peripheral area (area between the icons), the vibration is suddenly generated on the operation surface. Thereby, the operator may not understand the intention of the vibration generation, and may feel uncomfortable.

One example of the present disclosure provides an input device that uses an absolute value operation and performs an attraction control without providing an uncomfortable feeling to an operator.

According to one example embodiment, an input device may include: a detector that may detect an operation state of an operation object on an operation surface; a controller that may perform input to a predetermined instrument in accordance with the operation state detected by the detector; and a driver that may be controlled by the controller and vibrate the operation surface. The predetermined instrument may include a display. Multiple operation buttons may be displayed on the display. An operation coordinate position of the operation object on the operation surface may be associated with a display coordinate position of each of the multiple operation buttons on the display by an absolute coordinate. When determining that, due to a movement of the operation object on the operation surface, a corresponding display coordinate position on the display moves from a first operation button among the multiple operation buttons to a second operation button among the multiple operation buttons, the controller may cause the driver to generate a predetermined vibration on an area of the operation surface corresponding to an intermediate area between the first operation button and the second operation button to perform an attraction control for providing a feeling of attracting the operation object in a direction towards a display coordinate position corresponding to the second operation button. When a first display coordinate position on the display may correspond to a first operation coordinate position where the operation object firstly may touch the operation surface from a state where the operation object may be separated from the operation surface and may be positioned between the multiple operation buttons, the controller may correct the first display coordinate position on the display to a second display coordinate position of an operation button closest to the first display coordinate position among the multiple operation buttons or prohibit the attraction control.

According to one example embodiment, in a case where the absolute coordinate is used, even when a first display coordinate position where the operation object firstly contacts the operation surface is between the multiple operation buttons, the first display coordinate position on the display is corrected to a second display coordinate position of the operation button closest to the first display coordinate position. Therefore, the predetermined vibration for the attraction control is not suddenly generated. The operator does not feel uncomfortable.

Also, even when the first display coordinate position where the operation object firstly contacts the operation surface is between the multiple operation buttons, the attraction control is prohibited. Therefore, the predetermined vibration for the attraction control is not suddenly generated. The operator does not feel uncomfortable.

First Embodiment

FIGS. 1 to 7 show an input device 100 according to a first embodiment. The input device 100 of the present embodiment is applied to, for example, a remote operation device for operating a navigation device 50. The input device 100 is mounted in a vehicle 10 with the navigation device 50. The navigation device 50 may correspond to a predetermined instrument of the present disclosure.

The navigation device 50 is a route guidance system showing current position information of the own vehicle on a map, traveling direction information, or guidance information to a destination desired by an operator, or the like. The navigation device 50 includes a liquid crystal display 51 as a display. The liquid crystal display 51 is placed in a center part of an instrument panel 11 of the vehicle 10 in a vehicle width direction. A display screen 52 is visually recognized by the operator.

The navigation device 50 is formed separately from the input device 100, and is set at a position away from the input device 100. The navigation device 50 and the input device 100 are connected by, for example, a controller area network bus (CAN bus, registered trademark). As shown in FIG. 1, a CAN communication may be also referred to as "CAN COM".

Figure 4A:
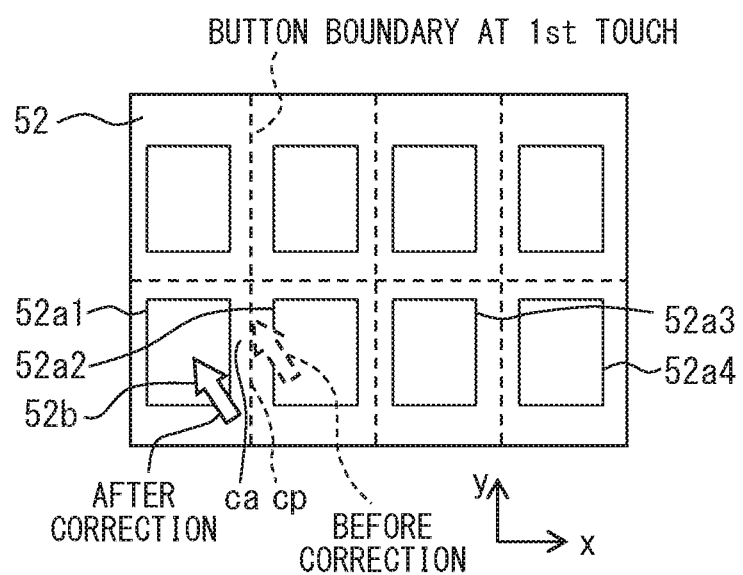
FIG. 4A is an explanatory diagram showing a control situation in the first embodiment.
Figure 4B:
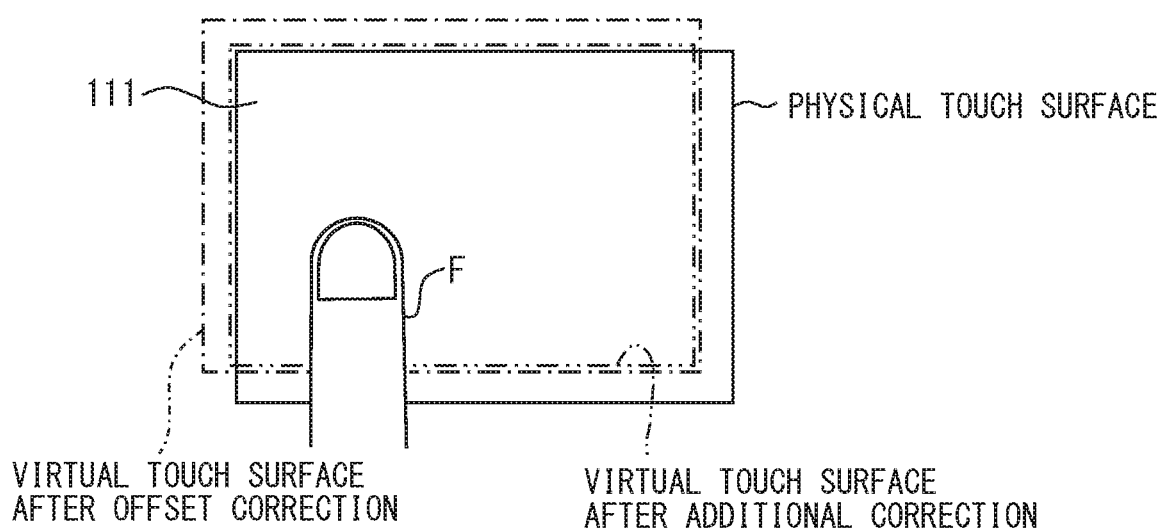
FIG. 4B is an explanatory diagram showing the control situation in the first embodiment.

On the display screen 52 of the liquid crystal display 51, a position of the own vehicle on the map is displayed, and various operation buttons 52a1 to 52a4 for operating the navigation device 50 are displayed (FIGS. 4A and 4B). The various operation buttons 52a1 to 52a4 are, for example, buttons for an enlarged display, a reduced display, a destination guidance setting, or the like. The various operation buttons 52a1 to 52a4 are a first operation button 52a1, a second operation button 52a2, a third operation button 52a3, and a fourth operation button 52a4, or the like. The various operation buttons 52a1 to 52a4 may be so-called operation icons. The various operation buttons may correspond to multiple operation buttons of the present disclosure. Although eight operation buttons are shown in FIG. 4A, hereinafter, the first to fourth operation buttons 52a1 to 52a4 will be described as representative buttons.

In the display screen 52, for example, a pointer 52b designed in an arrow shape is displayed so as to correspond to a position of a finger F (operation object) of the operator on an operation portion 110 (more specifically, operation surface 111). The pointer 52b may not be displayed on the display screen 52. The operation object is on the operation surface 111 on the operation side. The finger F of the operator may correspond to one example of the operation object of the present disclosure.

In the display screen 52, each area between various operation buttons 52a1 to 52a4 is defined as an intermediate area ca. Furthermore, a predetermined position (for example, a center position or an arbitrary position in the middle) in the intermediate area ca is defined as an intermediate position cp.

In the present embodiment, a coordinate position (operation coordinate position) of the finger F on the operation surface 111, coordinate positions (display coordinate positions) of various operation buttons 52a1 to 52a4 on the liquid crystal display 51 (display screen 52), and a coordinate position of the pointer 52b are associated by an absolute coordinate. An absolute position operation is performed.

As shown in FIGS. 1 to 4B, the input device 100 is placed at a position adjacent to an armrest 13 in a center console 12 of the vehicle 10. The input device 100 is placed in a range that is easily reached by a hand of the operator. The input device 100 includes the operation portion 110, a driver 120, and a controller 130, or the like.

The operation portion 110 forms a so-called touch pad, and serves as a portion for performing the input operation on the navigation device 50 with the finger F of the operator. The operation portion 110 includes the operation surface 111, a touch sensor 112, and a housing 113 or the like.

The operation surface 111 is exposed to the operator side at the position adjacent to the armrest 13, and is a plane portion on which the operator performs the finger operation. For example, the operation surface 111 is formed by placing a material that improves finger sliding over the entire surface or the like.

On the operation surface 111, it is set so that input for an operation (for example, selection, pressing decision, or the like) to the various operation buttons 52a1 to 52a4 displayed on the display screen 52 can be performed by the finger operation of the operator. In peripheral of the operation surface 111, a rib 111a extending to a side opposite to the operation side is placed.

The touch sensor 112 is, for example, a capacitance type detector placed on a back side of the operation surface 111. The touch sensor 112 is formed in a rectangular flat plate shape, and detects an operation state of the finger F of the operator on a sensor surface. The touch sensor 112 may correspond to one example of a detector of the present disclosure.

The touch sensor 112 is formed by arranging an electrode extending along an x-axis direction on the operation surface 111 and an electrode extending along a y-axis direction in a grid shape. These electrodes are connected to the controller 130. A generated capacitance of each electrode changes in accordance with the position of the operator finger F approaching the sensor surface. A signal (sensitivity value) of the generated capacitance is output to the controller 130. The sensor surface is covered with an insulation sheet made of an insulation material. The touch sensor 112 is not limited to the capacitance type. Various types such as a pressure sensitive type can be employed.

The housing 113 is a support portion that supports the operation surface 111 and the touch sensor 112. The housing 113 is formed in a frame shape, and, for example, is placed inside the center console 12.

The driver 120 vibrates the operation surface 111 in a surface direction of the operation surface 111, that is, directions of two axes including the x-axis and the y-axis of the operation surface 111. The driver 120 is placed between a rib 111a and the housing 113 at one or more sides. The driver 120 is connected to the controller 130. The controller 130 controls vibration generation.

The driver 120 enables vibration in only one axis direction of the two axis directions, and thereby generates the vibration in one axis direction (x-axis direction or y-axis direction) on the operation surface 111. The driver 120 enables the vibrations in two axis directions, and can generate the vibration on the operation surface 111 in an oblique direction obtained by combining the two vibrations.

Figure 3A:
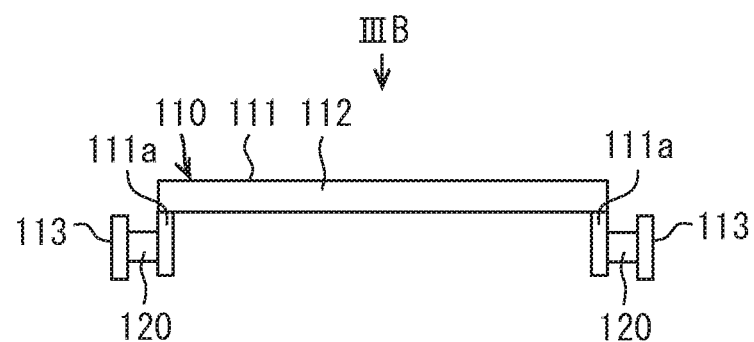
FIG. 3A is a side view showing an operation portion and a driver in a first embodiment.
Figure 3B:
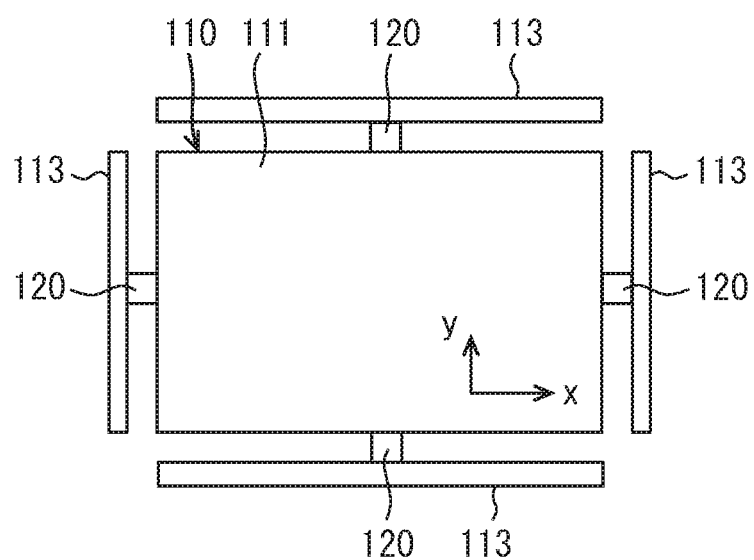
FIG. 3B is a plane view viewed from a direction of an arrow IIIB of FIG. 3A.

As the driver 120, for example, an electromagnetic actuator such as a solenoid or a voice coil motor, a vibrator such as a piezo or a combination of the vibrator or a spring or the like can be employed. For example, when one vibrator generates the vibrations in two axis directions, the driver 120 can be formed by at least placing the one vibrator at one side among the four sides corresponding to the circumference of the operation surface 111. Alternatively, when the vibrator generates the vibration in only one direction, the driver 120 can be formed by arranging the vibrator at each of two sides adjacent to each other corresponding to the circumference of the operation surface 111 (that is, arranging two vibrators in total). Alternatively, when the combination of the vibrator in one direction and the spring is placed at each of two sides, the driver 120 can be formed by placing two sets of the combinations so that the vibration directions intersect. In the present embodiment, as shown in FIGS. 3A and 3B, the driver 120 corresponds to the vibrators placed at the four sides corresponding to the circumference of the operation surface 111.

The controller 130 includes a CPU, a RAM, and a storage medium, or the like. Based on a signal obtained from the touch sensor 112, the controller 130 acquires, as the operation state of the finger F of the operator, a contact position (in other words, a contact coordinate) of the finger F on the operation surface 111, a movement direction, and a movement distance or the like. At this time, the controller 130 displays the pointer 52b at the coordinate position on the display screen 52 corresponding to the coordinate position of the finger F on the operation surface 111, and displays the pointer 52b so that the pointer 52b moves on the display screen 52 in accordance with the movement of the finger F (corresponding to an absolute value operation). The pointer 52b is displayed so as to move on the various operation buttons 52a1 to 52a4 on the display screen 52.

The controller 130 controls the generation state of the vibration by the driver 120 while correcting the coordinate position of the pointer 52b on the display screen 52 as necessary in accordance with these operation states. A vibration control parameter (vibration map) when the vibration is controlled is stored in the storage medium of the controller 130 in advance. The controller 130 controls the vibration based on this vibration control parameter.

Figure 5:
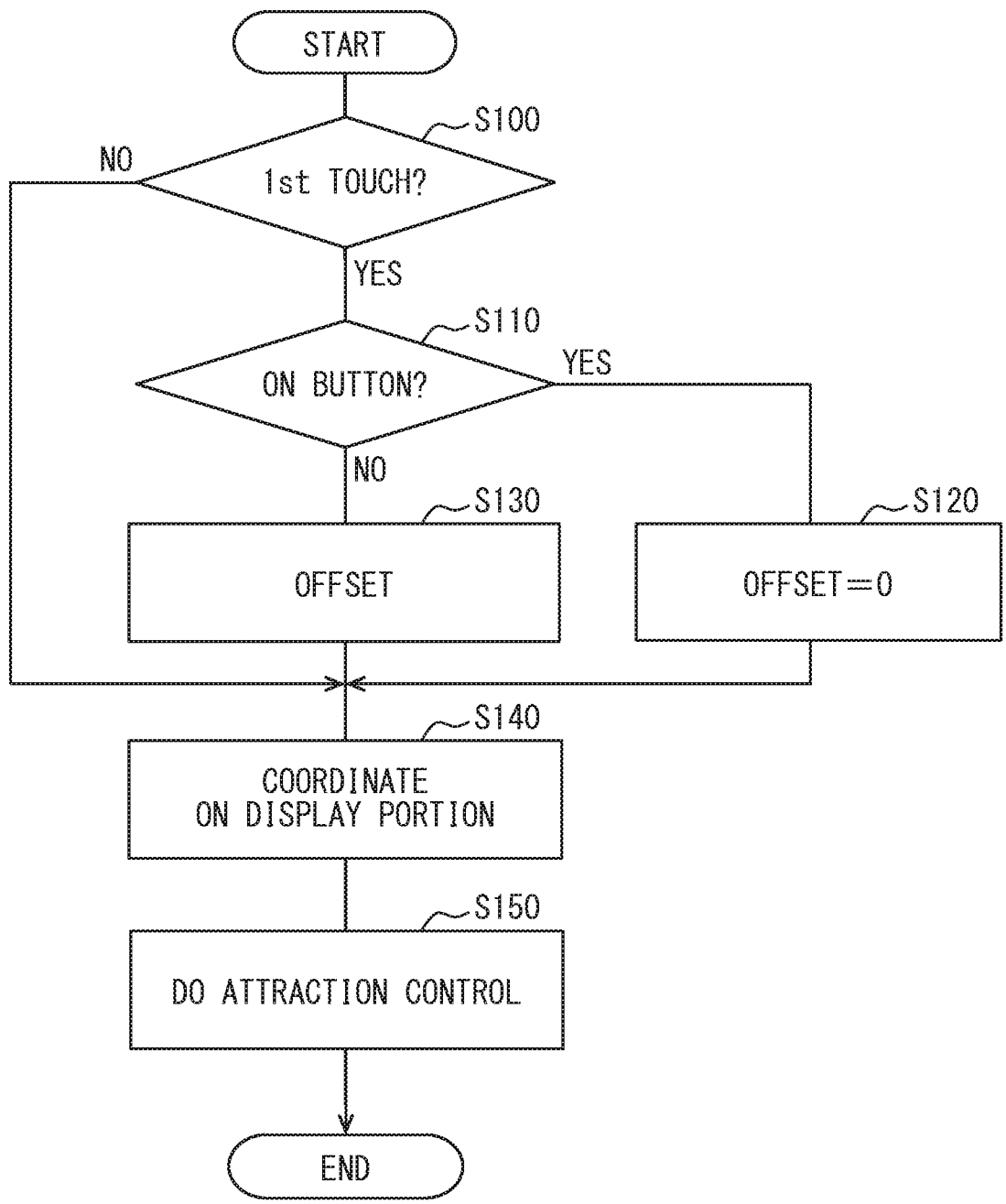
FIG. 5 is a flowchart showing the control content in the first embodiment.

The configuration of the input device 100 according to the present embodiment is as described above, and the actuation and effect will be described below with reference to FIGS. 5 to 7. Based on a flowchart of FIG. 5, the controller 130 corrects the coordinate position of the pointer 52b on the display screen 52 as necessary, and performs a control of attracting (pulling) the finger F to the operation button as the movement destination.

In S100, the controller 130 determines whether a touch (in other words, contact) of the finger F on operation surface 111 is a first touch (hereinafter, 1st touch). The 1st touch is an operation state when the finger F firstly contact with the operation surface 111 in a state where the finger F is separated from the operation surface 111. When the determination is negative in S100, the process shifts to S140.

When the determination is position in S100, the controller 130 determines whether the coordinate position of the finger F touching the operation surface 111 corresponds to the coordinate position on any of the operation buttons (52a1 to 52a4) on the display screen 52 in S110.

When determining that the coordinate position of the finger F is the coordinate position on any of the operation buttons (52a1 to 52a4) in S110, the controller 130 sets an offset amount for a position coordinate of the pointer 52b on the display screen 52 to zero without correction in S120.

However, when determining that the coordinate position of the finger F in accordance with the 1st touch is not the coordinate position on any of the operation buttons (52a1 to 52a4), that is, the coordinate position of the finger F is in an area (intermediate area ca) between the operation buttons in S110 (as shown by a broken line pointer of FIG. 4A), the controller 130 sets the offset amount for correcting the coordinate position of the pointer 52b in S130. The offset amount is an amount obtained by subtracting the position coordinate of the pointer 52b from the position coordinate (for example, center position coordinate) of the operation button (52a1) closest to the pointer 52b.

In S140, the controller 130 sets the position coordinate of the pointer 52b on the display screen 52 to a position coordinate obtained by adding the offset amount set in S120 and S130 to the position coordinate of the actually touching finger F. For example, in FIG. 4A, when the pointer 52b is positioned in the intermediate area ca (position indicated by the broken line pointer) at the 1st touch, the position coordinate of the pointer 52b is corrected to the position coordinate (for example, center position of the button) of the closest operation button (52a1). When the pointer 52b is positioned on any of the operation buttons (52a1 to 52a4) at the 1st touch, the offset amount is zero and the actual correction is not performed.

By this correction, as shown in FIG. 4B, the original physical operation surface 111 shown by the solid line becomes a virtual operation surface obtained by shifting the original physical operation surface 111 by the offset amount as shown by the dashed dotted line. Furthermore, as shown by the long dashed double-dotted line, after the offset, the virtual operation surface may be corrected to a correction operation surface on which a selectable area is not narrowed. The correction operation surface is formed so that a movement distance (in other words, movement amount) of the pointer 52b on the display screen 52 in accordance with a movement distance of the finger F after the correction is larger than a movement distance before the correction.

In S150, the controller 130 performs the attraction control in accordance with the position coordinate of the pointer 52b on the display screen 52.

That is, the controller 130 performs the attraction control when determining that the coordinate position of the pointer 52b on the corresponding display screen 52 moves from the operation button of any one (for example, first operation button 52a1) of the multiple operation buttons 52a1 to 52a4 to the different operation button (for example, second operation button 52a2), based on the movement of the finger F on the operation surface 111.

The controller 130 causes the driver 120 to generate the vibration that is a stationary wave in a direction in accordance with the movement destination of the finger F on the operation surface 111 when the moving pointer 52b is positioned in the intermediate area ca. Here, the operation buttons 52a1 and 52a2 are set to be arranged in the x-axis direction, and therefore the vector direction (movement direction) of the finger F is the x-axis direction. The controller 130 generates the vibration along the x-axis direction.

Figure 6:
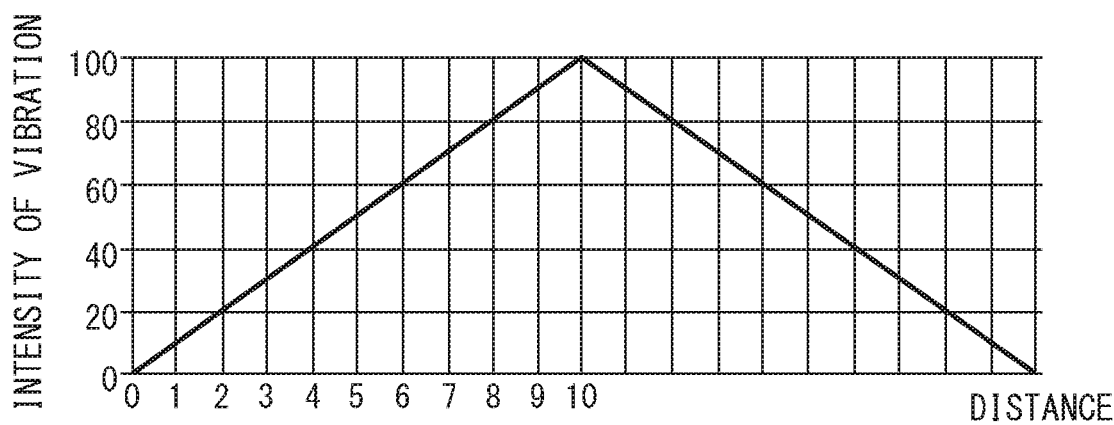
FIG. 6 is a graph showing an intensity of vibration when a finger is attracted in the first embodiment.

As shown in FIG. 6, the controller 130 performs the control so that an intensity of the vibration is a maximum value at the middle point (corresponding to the intermediate position cp) of the intermediate area ca, in accordance with the movement position of the finger F (pointer 52b). The controller 130 changes the intensity linearly when the intensity of the vibration is changed to the maximum value.

FIG. 4A shows a case where the intermediate position cp in the intermediate area ca is set to the center position of the intermediate area ca for better understanding. The intermediate position cp is not limited to the center position of the intermediate area ca, and may be any position in the intermediate area ca.

Figure 7:
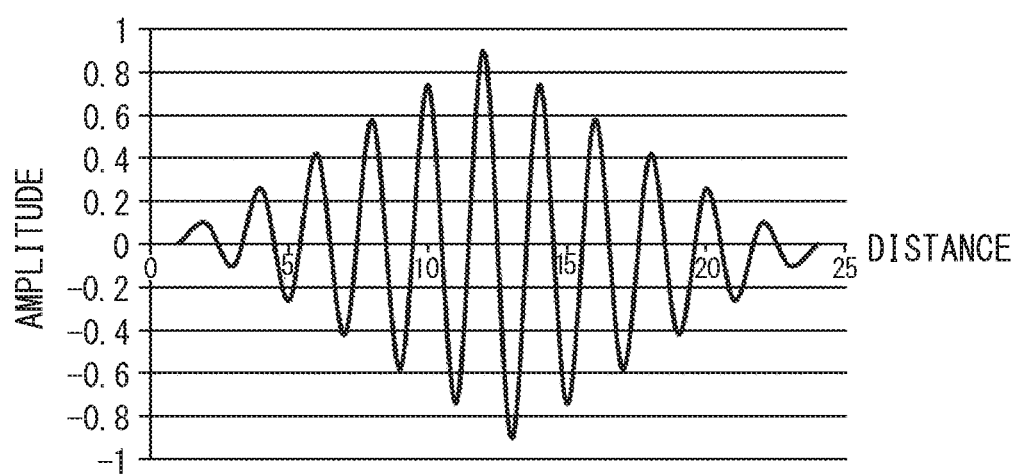
FIG. 7 is a graph showing a vibration waveform when the finger is attracted in the first embodiment.

As shown in FIG. 7, the controller 130 changes an amplitude for changing the intensity of the vibration to the maximum value. Specifically, while the finger F (pointer 52b) moves from the first operation button 52a1 to the intermediate position cp, the amplitude is sequentially increased in accordance with the movement position. Thereby, the intensity of the vibration is increased. The controller 130 maximizes the amplitude at the intermediate position cp. After the finger F passes the intermediate position cp, the amplitude is sequentially decreased to be returned to the original amplitude in accordance with the movement position. Thereby, the intensity of the amplitude is decreased. Such a change of the amplitude forms an apparent peak (mountain) and an apparent bottom (valley) of resistance on the operation surface 111. The finger F is operated (moved) as if the finger F is passing over this peak.

Due to the process in S150, when the finger F moves from the first operation button 52a1 to the second operation button 52a2, the finger F receives the resistance caused by the vibration generated on the operation surface 111. In addition, as the finger F moves from the first operation button 52a1 to a position corresponding to the intermediate position cp, the intensity of the vibration is controlled to be the maximum value. Therefore, the resistance received by the finger F increases. As the finger F moves from the intermediate position cp to a position corresponding to the second operation button 52a2, the intensity of the vibration is controlled to decrease after reaching the maximum value. Therefore, the resistance received by the finger F decreases.

The finger F reaches the position corresponding to the second operation button 52a2 over the maximum resistance at the intermediate position cp. The finger F receives a sensation (in other words, effect) as if being guided (in other words, attracted) from the intermediate position cp to the position corresponding to the second operation button 52a2. Then, the feeling of guidance may be also referred to as a feeling of passing over a peak (mountain).

In the present embodiment, when the operator moves the finger F, the finger F is guided in the movement direction, and the feeling of being guided to the movement destination is obtained.

According to the present embodiment, in a case where the absolute coordinate is used, even when a first coordinate position (first display coordinate position) corresponding to a position where the finger F firstly touches the operation surface 111 is between the multiple operation buttons 52a1 to 52a4, the first coordinate position on the display screen 52 is corrected to a second coordinate position (second display coordinate position) of the operation button closest to the first coordinate position. Therefore, the predetermined vibration for the attraction control is not suddenly generated. The operator does not feel uncomfortable.

After correcting the coordinate position (display coordinate position) of the pointer 52b on the display screen 52 to the coordinate position of the closest operation button (52a1), the controller 130 increases the movement amount of the coordinate on the display screen 52 due to the movement of the finger F more than the movement amount before the correction. Thereby, an operable area is not narrowed, and a finger operation is not prevented.

Modification of First Embodiment

Figure 8:
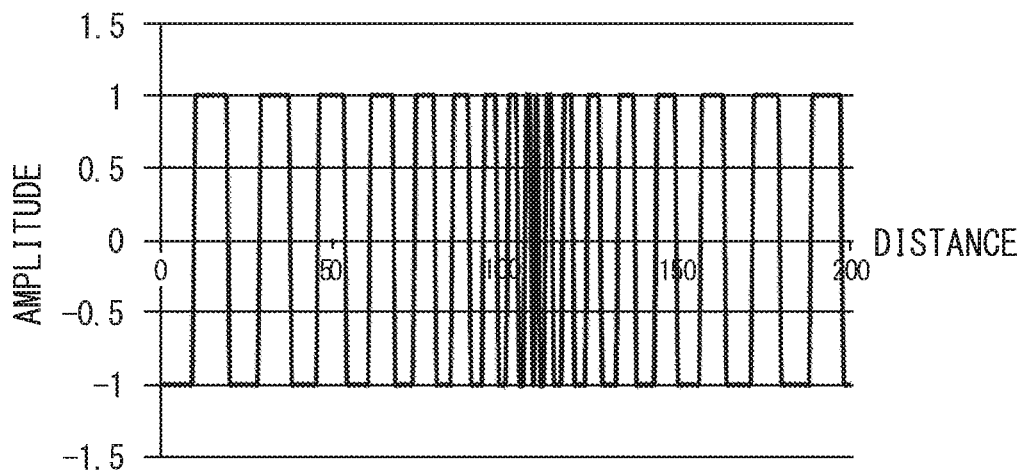
FIG. 8 is a graph showing the vibration waveform in a modification 1 of the first embodiment.
Figure 9:
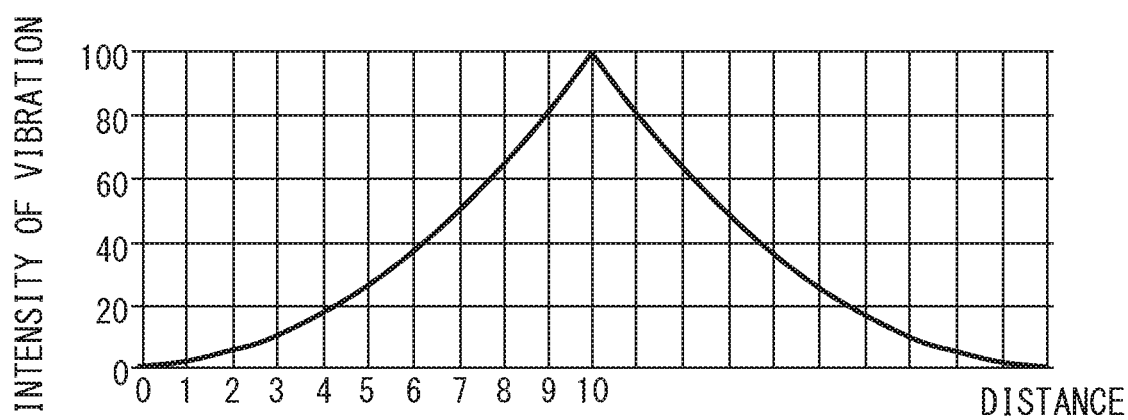
FIG. 9 is a graph showing the intensity of the vibration in a modification 2 of the first embodiment.

FIGS. 8 and 9 show a modification of the first embodiment. Here, as shown in FIG. 8, the controller 130 changes a frequency of the vibration with the same amplitude for controlling the intensity of the vibration to be the maximum value. Specifically, while the finger F (pointer 52b) moves from the first operation button 52a1 to the intermediate position cp, the frequency of the vibration is sequentially increased. Thereby, the intensity of the vibration is increased. The frequency is maximized at the intermediate position cp. After the finger F (pointer 52b) passes the intermediate position cp, the frequency of the vibration is decreased to be returned to the original frequency. Thereby, the intensity of the vibration is decreased.

As shown in FIG. 9, when maximizing the intensity of the vibration, the controller 130 may change the intensity exponentially. According to Weber-Fechner law, since the amount of human sensation is proportional to a logarithm of a stimulus intensity. Therefore, the exponential change enables humans to more easily understand.

Second Embodiment

Figure 10A:
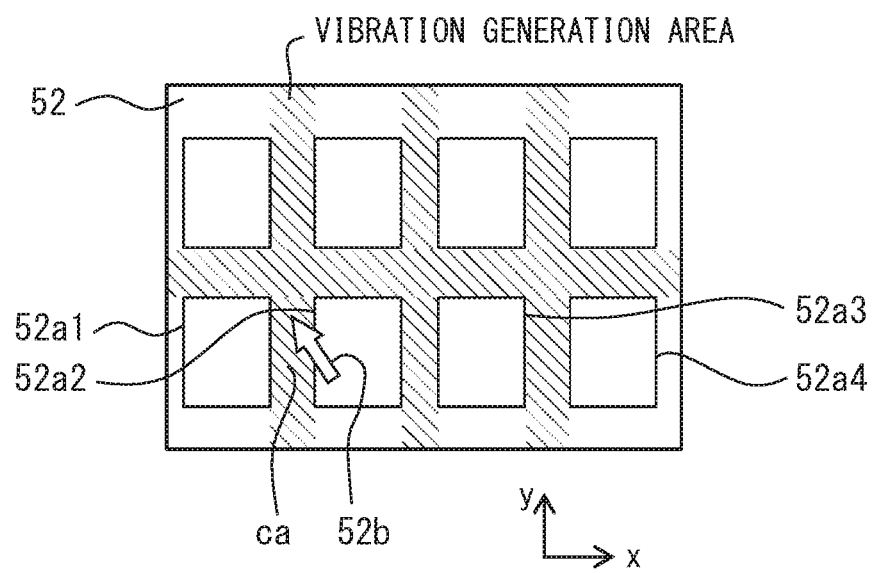
FIG. 10A is an explanatory diagram showing a control situation in a second embodiment.
Figure 10B:
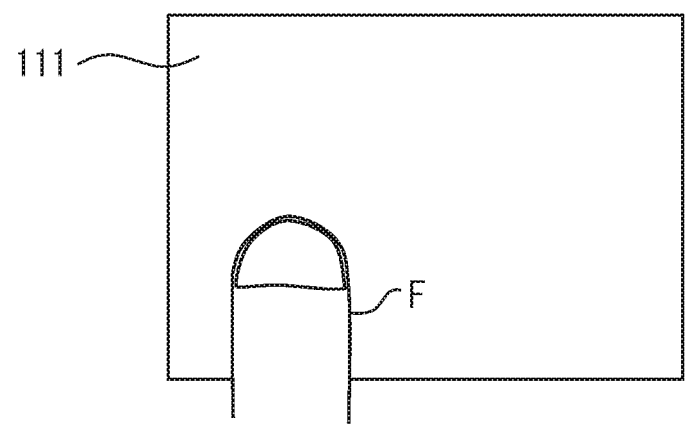
FIG. 10B is an explanatory diagram showing the control situation in the second embodiment.
Figure 11:
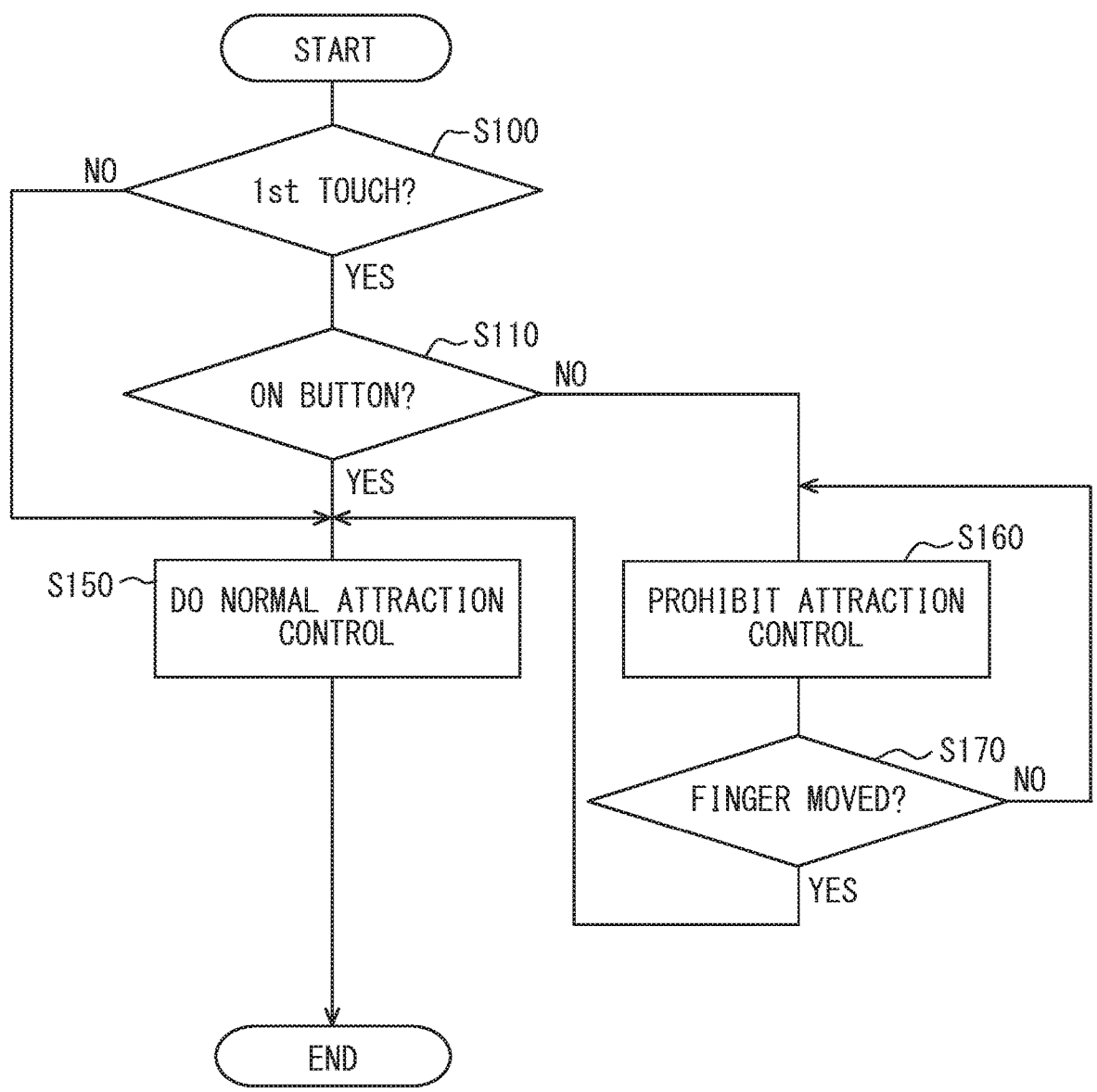
FIG. 11 is a flowchart showing a control content in the second embodiment.

FIGS. 10A, 10B and 11 show a second embodiment. A configuration of the second embodiment is same as that of the first embodiment. In the second embodiment, the control content when the position of the pointer 52b by the 1st touch is not on any of the operation buttons 52a1 to 52a4 (when the position is in the intermediate area ca) is changed.

FIG. 11 is a flowchart showing a control content in the second embodiment. The processes in S150, S160, and S170 are executed after the processes in S100 and S110.

When the determinations are positive in S100 and S110, the pointer 52b by the 1st touch is on any of the operation buttons. The controller 130 performs the normal attraction control in S150. Even when the determination is negative in S100, the controller 130 performs the normal attraction control in S150.

However, when the determination is negative in S110, that is, when the pointer 52b is positioned between the multiple operation buttons 52a1 to 52a4 (as shown by the pointer 52b in FIG. 10A), the controller 130 prohibits the attraction control from being performed in S160. In S170, it is determined whether the finger F has moved. When the finger F has moved, the attraction control is performed in S150. When the finger F has not moved in S170, the process in S160 is repeated.

According to the present embodiment, even when the first coordinate position where the finger F firstly touches the operation surface 111 is between the multiple operation buttons (52a1 to 52a4), the attraction control is prohibited. Therefore, the predetermined vibration for the attraction control is not suddenly generated. The operator does not feel uncomfortable.

Third Embodiment

Figure 12:
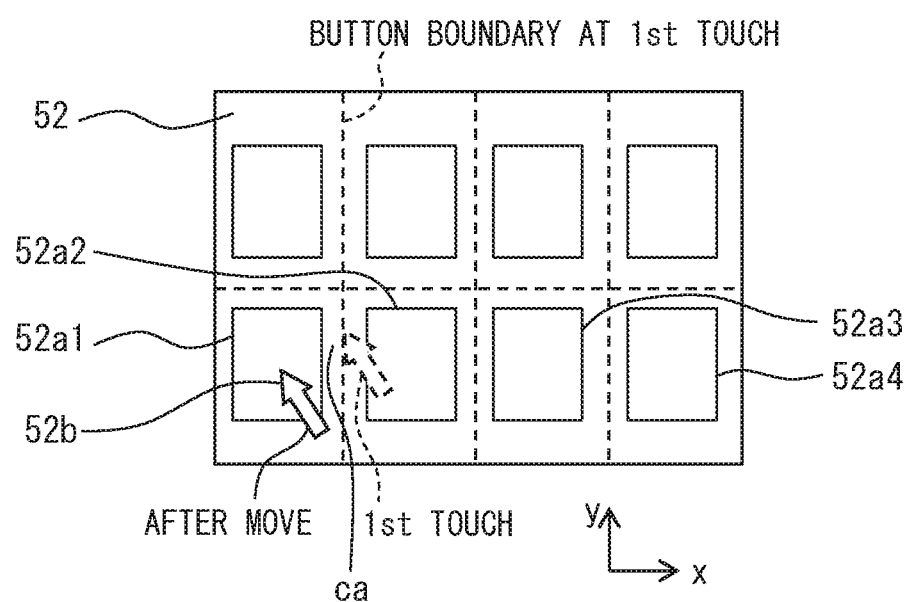
FIG. 12 is an explanatory diagram showing a control situation in a third embodiment.
Figure 13:
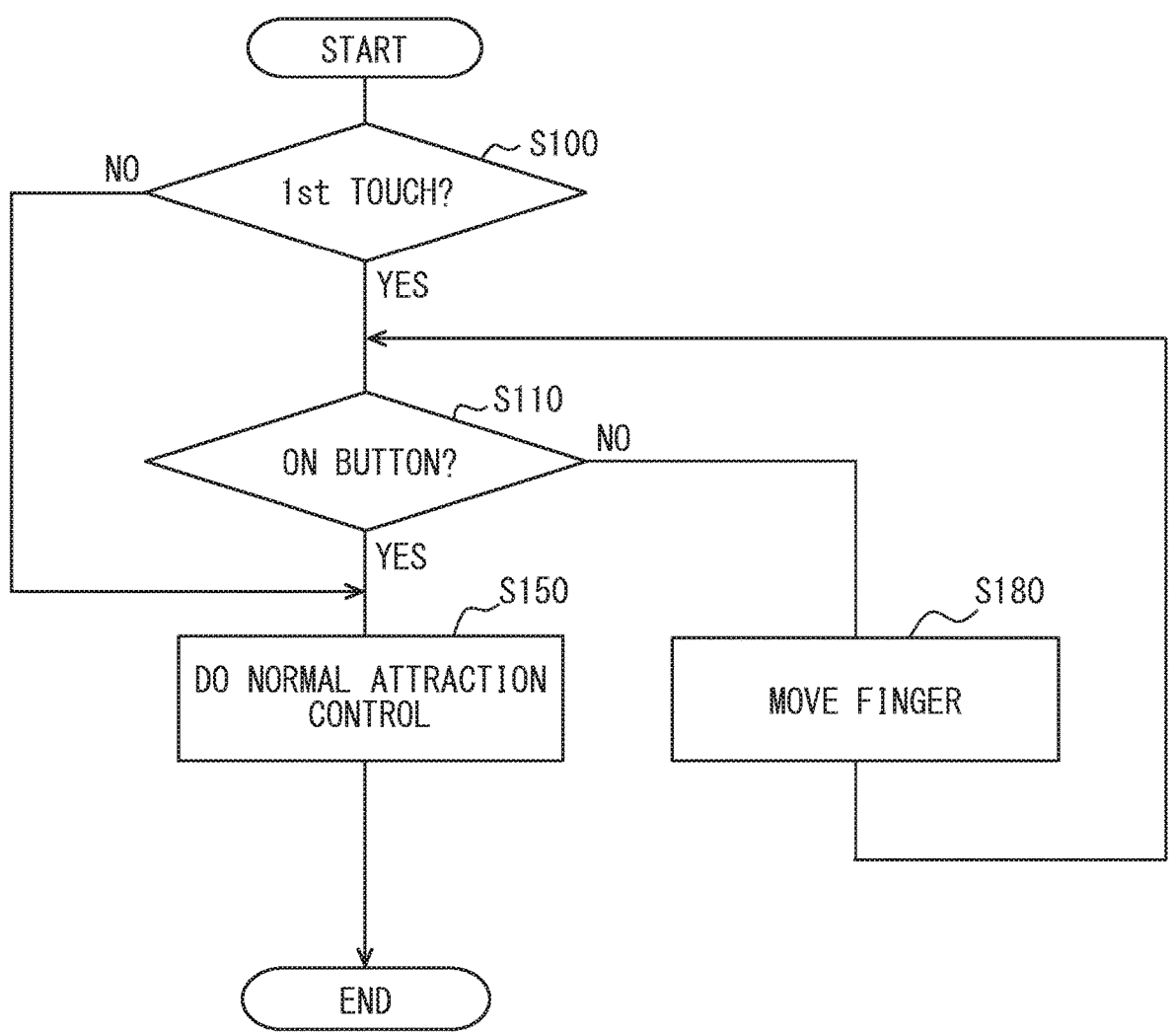
FIG. 13 is an explanatory diagram showing the control situation in the third embodiment.

FIGS. 12 and 13 show a third embodiment. A configuration of the third embodiment is same as that of the first embodiment. In the third embodiment, the control content when the position of the pointer 52b by the 1st touch is not on any of the operation buttons 52a1 to 52a4 (when the position is in the intermediate area ca) is changed.

FIG. 13 is a flowchart showing a control content in the third embodiment. The processes in S150 and S180 are executed after the processes in S100 and S110 in the first embodiment (FIG. 5).

When the determinations are positive in S100 and S110, the pointer 52b by the 1st touch is on any of the operation buttons. The controller 130 performs the normal attraction control in S150. Even when the determination is negative in S100, the controller 130 performs the normal attraction control in S150.

However, when the determination is negative in S110, that is, the pointer 52b is positioned in the area (intermediate area ca) between the multiple operation buttons 52a1 to 52a4 (as shown by the broken line pointer 52b in FIG. 12), the controller 130 attracts the finger F to move to the coordinate position corresponding to the closest operation button (for example, first operation button 52a1) in S180. When the finger F has moved to the coordinate position corresponding to the closest operation button (in S110), the attraction control is performed in accordance with the coordinate position on the display screen 52 due to the movement of the finger F in S150.

The controller 130 deals with the attraction movement of the finger F as follows, for example. That is, the controller 130 calculates a vector from the position (intermediate area ca) of the pointer 52b on the display screen 52 to the closest operation button (for example, first operation button 52a1).

Next, the controller 130 generates a plane direction vibration for generating a attraction force in a direction of the calculated vector. The controller 130 sets, as the plane direction vibration, a vibration that is the stationary wave in the direction of the calculated vector along the extended surface of the operation surface 111. For example, in a case of FIG. 12, a vibration along a lower left direction is set.

The controller 130 sets the speed or the acceleration of the vibration that is the stationary wave on an outward route to be different from that on a return route. Here, a direction of the outward route corresponds to a direction in which the finger F is to be moved (towards the operation button side), and the controller 130 sets the speed or the acceleration on the outward route to be smaller than that on the return route.

On the outward route where the speed or the acceleration of the vibration is small, the finger F is moved in the direction of the outward route due to the friction between the finger F and the operation surface 111. On the other hand, on the return route where the speed or the acceleration of the vibration is large, slipping occurs between the finger F and the operation surface 111, and the finger F is left from the operation surface 111. That is, the finger F is attracted in the direction of the outward route where the speed or the acceleration of the vibration is small.

According to the present embodiment, even when the first coordinate position where the finger F firstly touches the operation surface 111 is between the multiple operation buttons (52a1 to 52a4), the finger F is attracted to be moved to the coordinate position corresponding to the closest operation button (52a1). Therefore, the predetermined vibration for the attraction control is not suddenly generated. The operator does not feel uncomfortable.

Fourth Embodiment

Figure 14A:
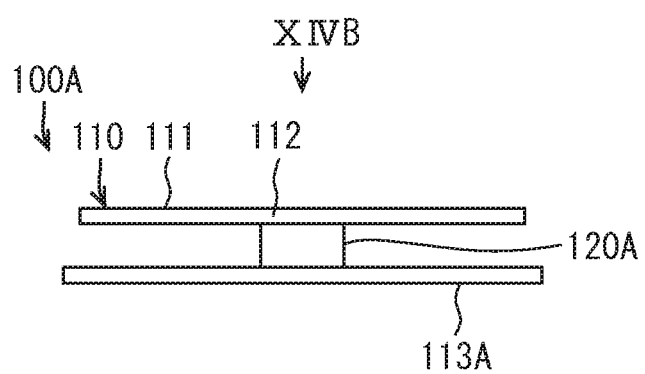
FIG. 14A is a side view showing an operation portion and a driver in a fourth embodiment.
Figure 14B:
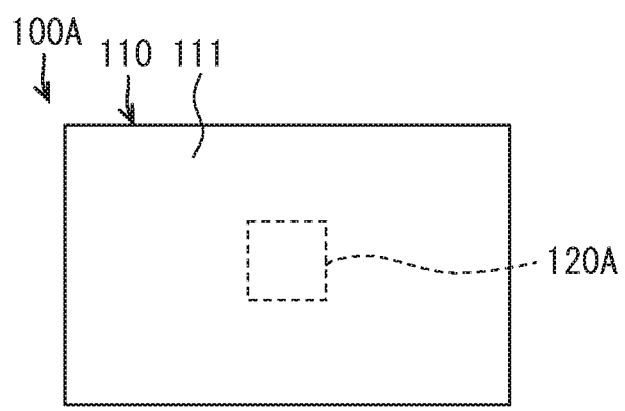
FIG. 14B is a plane view viewed from a direction of an arrow XIVB of FIG. 14A.

FIGS. 14A and 14B show an input device 100A according to a fourth embodiment. The fourth embodiment is different from the first embodiment in that the setting positions of the housing 113 and the driver 120 are changed. Instead of the housing 113 and the driver 120, the fourth embodiment includes a housing 113A and a driver 120A.

The housing 113A is formed in a plate shape, and is arranged on the back side of the operation surface 111. The driver 120A is arranged on the back side of the operation surface 111. The driver 120A is positioned between the back surface of the operation surface 111 and the housing 113A. For example, the driver 120A generates the vibrations in two axes directions corresponding to the x-axis and the y-axis. The driver 120A is placed on a central part of the back surface of the operation surface 111. As the driver 120A, for example, the electromagnetic actuator such as the voice coil motor capable of generating the vibrations in the two axis directions is used, as described in the first embodiment. The number of drivers 120A is not limited to one, and multiple drivers 120A may be used.

In the present embodiment, the basic actuation is same as that of the first embodiment. It may be possible to obtain the similar effects.

Other Embodiments

In each embodiment, it is described that the vibration control parameter (vibration map) set in advance may be used for controlling the intensity of the vibration. However, it is not limited to this. In accordance with the operation state of the finger F, the vibration pattern may be obtained by calculation for each state.

In each embodiment, when the attraction control is performed, the vibration in the direction where the finger F moves is generated along the operation surface 111. Alternatively, the vibration in the direction intersecting with the operation surface 111 is generated, and the attraction feeling may be provided by using the squeeze effect.

In each embodiment, the operation portion 110 is the so-called touch pad type. However, it is not limited to this. The so-called touch panel type in which the display screen 52 of the liquid crystal display 51 is transparent and the display is visually recognized in the operation surface 111 may be applicable.

In each embodiment, it is described that the operation object is the finger F of the operator. However, it is not limited to this. A stick imitating a pen may be employed.

In each embodiment, an input control target (predetermined instrument) by the input device 100 or 100A is the navigation device 50. However, it is not limited to this. A different instrument such as an air conditioner for the vehicle or an audio device for the vehicle may be applicable.

The controller and the method described in the present disclosure may be implemented by a special purpose computer configuring a processor programmed to perform one or more functions embodied by a computer program. Alternatively, the controller and the method described in the present disclosure may be implemented by a special purpose computer configured as a processor with a special purpose hardware logic circuits.

Alternatively, the controller and the method described in the present disclosure may be implemented by one or more dedicated computers configured by a combination of a processor executing a computer program and one or more hardware logic circuits. The computer programs may be stored, as instructions being executed by a computer, in a non-transitory tangible computer-readable storage medium.

It is noted that a flowchart or the process of the flowchart in the present application includes multiple steps (also referred to as sections), each of which is represented, for instance, as S100. Further, each step can be divided into several sub-steps while several steps can be combined into a single step.

In the above, the embodiments, the configurations, the aspects of the input device according to the present disclosure are exemplified. However, the present disclosure is not limited to every embodiment, every configuration and every aspect related to the present disclosure. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. An input device comprising:
a detector configured to detect an operation state of an operation object on an operation surface;
a controller configured to perform input to a predetermined instrument in accordance with the operation state detected by the detector; and
a driver configured to be controlled by the controller and vibrate the operation surface,
wherein:
the predetermined instrument includes a display;
a plurality of operation buttons are displayed on the display;
an operation coordinate position of the operation object on the operation surface is associated with a display coordinate position of each of the plurality of operation buttons on the display by an absolute coordinate;
when determining that, due to a movement of the operation object on the operation surface, a corresponding display coordinate position on the display moves from a first operation button among the plurality of operation buttons to a second operation button among the plurality of operation buttons, the controller is configured to cause the driver to generate a predetermined vibration on an area of the operation surface corresponding to an intermediate area between the first operation button and the second operation button to perform an attraction control for providing a feeling of attracting the operation object in a direction towards a display coordinate position corresponding to the second operation button; and
when a first display coordinate position on the display corresponds to a first operation coordinate position where the operation object firstly touches the operation surface from a state where the operation object is separated from the operation surface and is positioned between the plurality of operation buttons, the controller is configured to
correct the first display coordinate position on the display to a second display coordinate position of an operation button closest to the first display coordinate position among the plurality of operation buttons or
prohibit the attraction control.

2. The input device according to claim 1, wherein:
after correcting the first display coordinate position on the display to the second display coordinate position of the operation button closest to the first display coordinate position, the controller is configured to increase a coordinate movement amount on the display position due to the movement of the operation object more than a coordinate movement amount before the first display coordinate position is corrected.

3. The input device according to claim 1, wherein:
when the operation object moves after the controller is configured to prohibit the attraction control, the controller is configured to perform the attraction control in accordance with a display coordinate position corresponding to the operation object.

4. The input device according to claim 1, wherein:
the detector includes a sensor configured to detect the operation state of the operation object;
the driver includes an actuator configured to be controlled by the controller and vibrate the operation surface; and
the controller includes
one or more processors; and
a memory coupled to the one or more processors and storing program instructions that when executed by the one or more processors cause the one or more processors to at least:
perform the input to the predetermined instrument;

cause the actuator to generate the predetermined vibration; and correct the first display coordinate position or prohibit the attraction control.

5. An input device comprising:

a detector configured to detect an operation state of an operation object on an operation surface;

a controller configured to perform input to a predetermined instrument in accordance with the operation state detected by the detector; and a driver configured to be controlled by the controller and vibrate the operation surface, wherein:

the predetermined instrument includes a display;

a plurality of operation buttons are displayed on the display;

an operation coordinate position of the operation object on the operation surface is associated with a display coordinate position of each of the plurality of operation buttons on the display by an absolute coordinate;

when determining that, due to a movement of the operation object on the operation surface, a corresponding display coordinate position on the display moves from a first operation button among the plurality of operation buttons to a second operation button among the plurality of operation buttons, the controller is configured to cause the driver to generate a predetermined vibration on an area of the operation surface corresponding to an intermediate area between the first operation button and the second operation button to perform an attraction control for providing a feeling of attracting the operation object in a direction towards a display coordinate position corresponding to the second operation button;

when a first display coordinate position on the display corresponds to a first operation coordinate position where the operation object firstly touches the operation surface from a state where the operation object is separated from the operation surface and is positioned between the plurality of operation buttons, the controller is configured to correct the first display coordinate position on the display to a second display coordinate position of an operation button closest to the first display coordinate position among the plurality of operation buttons, prohibit the attraction control, or attract the operation object for moving the operation object to a second operation coordinate position corresponding to the operation button closest to the first display coordinate position; and after correcting the first display coordinate position on the display to the second display coordinate position of the operation button closest to the first display coordinate position, the controller is configured to increase a coordinate movement amount on the display position due to the movement of the operation object more than a coordinate movement amount before the first display coordinate position is corrected.

6. An input device comprising:

a detector configured to detect an operation state of an operation object on an operation surface;

a controller configured to perform input to a predetermined instrument in accordance with the operation state detected by the detector; and a driver configured to be controlled by the controller and vibrate the operation surface, wherein:

the predetermined instrument includes a display;

a plurality of operation buttons are displayed on the display;

an operation coordinate position of the operation object on the operation surface is associated with a display coordinate position of each of the plurality of operation buttons on the display by an absolute coordinate;

when determining that, due to a movement of the operation object on the operation surface, a corresponding display coordinate position on the display moves from a first operation button among the plurality of operation buttons to a second operation button among the plurality of operation buttons, the controller is configured to cause the driver to generate a predetermined vibration on an area of the operation surface corresponding to an intermediate area between the first operation button and the second operation button to perform an attraction control for providing a feeling of attracting the operation object in a direction towards a display coordinate position corresponding to the second operation button;

when a first display coordinate position on the display corresponds to a first operation coordinate position where the operation object firstly touches the operation surface from a state where the operation object is separated from the operation surface and is positioned between the plurality of operation buttons, the controller is configured to correct the first display coordinate position on the display to a second display coordinate position of an operation button closest to the first display coordinate position among the plurality of operation buttons, prohibit the attraction control, or attract the operation object for moving the operation object to a second operation coordinate position corresponding to the operation button closest to the first display coordinate position; and when the operation object moves after the controller is configured to prohibit the attraction control, the controller is configured to perform the attraction control in accordance with a display coordinate position corresponding to the operation object.

* * * * *